(12) United States Patent
Zhao et al.

(10) Patent No.: US 7,747,257 B2
(45) Date of Patent: Jun. 29, 2010

(54) GPS ASSISTANCE MESSAGES IN CELLULAR COMMUNICATIONS NETWORKS AND METHODS THEREFOR

(75) Inventors: Yilin Zhao, Northbrook, IL (US); Thomas M. King, Tempe, AZ (US); George J. Geier, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 873 days.

(21) Appl. No.: 09/785,960

(22) Filed: Feb. 16, 2001

(65) Prior Publication Data

US 2002/0168985 A1    Nov. 14, 2002

(51) Int. Cl.
*H04Q 7/20* (2006.01)
(52) U.S. Cl. .................. 455/456.1; 455/427; 455/428; 455/429; 455/456.2; 455/456.5; 342/357.01; 342/357.06; 342/357.07; 342/357.09
(58) Field of Classification Search .......... 455/427, 455/428, 429, 403, 422.1, 456.1, 456.2, 456.3, 455/456.5, 456.6, 457, 12.1, 517, 550.1; 342/357.01, 357.06, 357.07, 357.09, 357.1
See application file for complete search history.

(56) References Cited

U.S. PATENT DOCUMENTS

| | | | |
|---|---|---|---|
| 5,731,786 A | 3/1998 | Abraham et al. | |
| 5,731,787 A | 3/1998 | Sheynblat | |
| 6,058,338 A | 5/2000 | Agashe et al. | |
| 6,070,078 A | 5/2000 | Camp, Jr. et al. | |
| 6,101,178 A | 8/2000 | Beal | |
| 6,134,423 A | 10/2000 | Wiedeman et al. | |
| 6,147,644 A | 11/2000 | Castles et al. | |
| 6,184,824 B1* | 2/2001 | Bode et al. ............. | 342/357.15 |
| 6,215,441 B1 | 4/2001 | Moeglein et al. | |
| 6,225,945 B1* | 5/2001 | Loomis ................. | 342/357.12 |
| 6,285,315 B1* | 9/2001 | Pratt ..................... | 342/357.09 |
| 6,336,076 B1* | 1/2002 | Farley et al. ............ | 701/213 |
| 6,611,756 B1* | 8/2003 | Chen et al. .............. | 701/213 |
| 2001/0014604 A1* | 8/2001 | Kingdon et al. .......... | 455/427 |
| 2002/0082774 A1* | 6/2002 | Bloebaum ............... | 701/213 |

(Continued)

FOREIGN PATENT DOCUMENTS

EP    0 451 607 A2    10/1991

(Continued)

OTHER PUBLICATIONS

*3rd Generation Partnership Project; Technical specification Group Radio Access Network; RRC Protocol Specification (Release 1999)*, 3GPP TS 25.331 V3.5.0 Dec. 2000.

(Continued)

*Primary Examiner*—Keith T Ferguson
(74) *Attorney, Agent, or Firm*—Roland K. Bowler, II

(57) ABSTRACT

GPS assistance message and data issue identifiers for transmission to GPS enabled mobile stations in cellular communications networks and methods therefore. The GPS data issue identifiers indicate whether GPS data, for example corresponding ephemeris and almanac data, stored at the mobile station requires updating. In the exemplary $3^{rd}$ generation (W-CDMA/UMTS) architecture, the GPS assistance message is a System Information Block (SIB), and the GPS ephemeris data identifier and corresponding satellite identifier is encoded in a value tag included in a Master Information Block (MIB).

16 Claims, 4 Drawing Sheets

U.S. PATENT DOCUMENTS

2002/0186165 A1* 12/2002 Eschenbach .......... 342/357.15

FOREIGN PATENT DOCUMENTS

| GB | 2347035 A | 8/2000 |
|---|---|---|
| HU | HU 220 523 B1 | 5/1997 |
| JP | 8327719 A | 12/1996 |
| JP | 11513787 A | 11/1999 |
| WO | 9954753 A1 | 10/1999 |
| WO | 0019231 A1 | 4/2000 |
| WO | 0048017 A1 | 8/2000 |
| WO | 0111382 A1 | 2/2001 |

OTHER PUBLICATIONS

3GPP TS 04.35, V8.3.0, $3^{RD}$ Generation Partnership Project, Jan. 2001, XP002280213.

Korean Search Report; 9964; May 30, 2005; 2 pages.

EP Search Report; 02 709 432.5; 5 pages.

EPC Supp Search Report; Counterpart EPC Application No. 02709432; Motorola; Aug. 2, 2004; 2 pages.

MEXI Office Action; Counterpart MEXI Application No. 2010214; Motorola; Mar. 26, 2007; 4 pages; English Translation Included.

JAPA Office Action; Counterpart JAPA Application No. 2002-566871; Motorola; Aug. 29, 2007; English Translation Included.

3GPP TS 04.35, V8.3.0, $3^{RD}$ Generation Partnership Project, Jan. 2001, XP002280213.

Korean Search Report; 9964; May 30, 2005; 2 pp.

EP Search Report; 02 709 432.5; 5 pages, Jul. 13, 2004.

* cited by examiner

GPS ASSISTANCE MESSAGES IN CELLULAR COMMUNICATIONS NETWORKS AND METHODS THEREFOR

FIELD OF THE INVENTIONS

The present inventions relate generally to locating mobile stations in cellular communications networks, more particularly to mobile station Global Positioning System (GPS) assistance messages transmitted to cellular handsets and methods therefor.

BACKGROUND OF THE INVENTIONS

In Assisted GPS mobile station positioning schemes, one or more ground based referenced station nodes coupled to a cellular communication network receive GPS satellites data and re-transmit the data in the form of assistance messages at higher data rate over the cellular air interface to mobile stations for use in position determination.

There are several types of GPS assistance messages. Ephemeris assistance messages include GPS ephemeris and clock correction data. Almanac assistance messages include almanac and other data, which includes generally truncated ephemeris, ionospheric delay elements, universal time coordinate (UTS) offset, and other data. Differential GPS (DGPS) assistance messages include differential correction data.

In some cellular communications architectures, for example the $3^{rd}$ generation (W-CDMA/UMTS) architecture, one or more a value tags are included in a header, or Master Information Block (MIB) transmitted separately from the assistance message by the network. In the W-CDMA/UMTS architecture, the assistance message is referred to as a System Information Block (SIB). The MIB and SIB are generally transmitted according to different schedules.

The value tags of the MIB generally provide scheduling information and inform the cellular mobile stations whether the content of the corresponding assistance message has been updated. Currently, a multi-bit cell value tag is used for Global Positioning System (GPS) assistance messages in the W-CDMA/UMTS specification. The GPS value tag is updated whenever any data, for example the GPS time stamp ("Transmission TOW" in the W-CDMA/UMTS specification), of the assistance message (SIB in W-CDMA/UMTS) is updated or changed.

Each assistance message, or SIB, is valid generally for a specific geographic area, for example for a particular cell or for a particular Public Mobile Land Network (PLMN). When a new MIB is read by the mobile station, its value tag for the corresponding SIB in the local cell or PLMN is compared to the value tag of the corresponding SIB stored previously in the mobile station. Presently, the mobile station ("User Equipment" in the W-CDMA/UMTS specification) updates the SIB any time the value tag of the corresponding MIB has been updated. Reading the SIB however consumes substantial power, which is a limited resource in battery powered mobile stations.

BRIEF DESCRIPTION OF THE DRAWINGS

The various aspects, features and advantages of the present invention will become more fully apparent to those having ordinary skill in the art upon careful consideration of the following Detailed Description of the Inventions with the accompanying drawings described below.

DETAILED DESCRIPTION OF THE INVENTIONS

Figure 1:
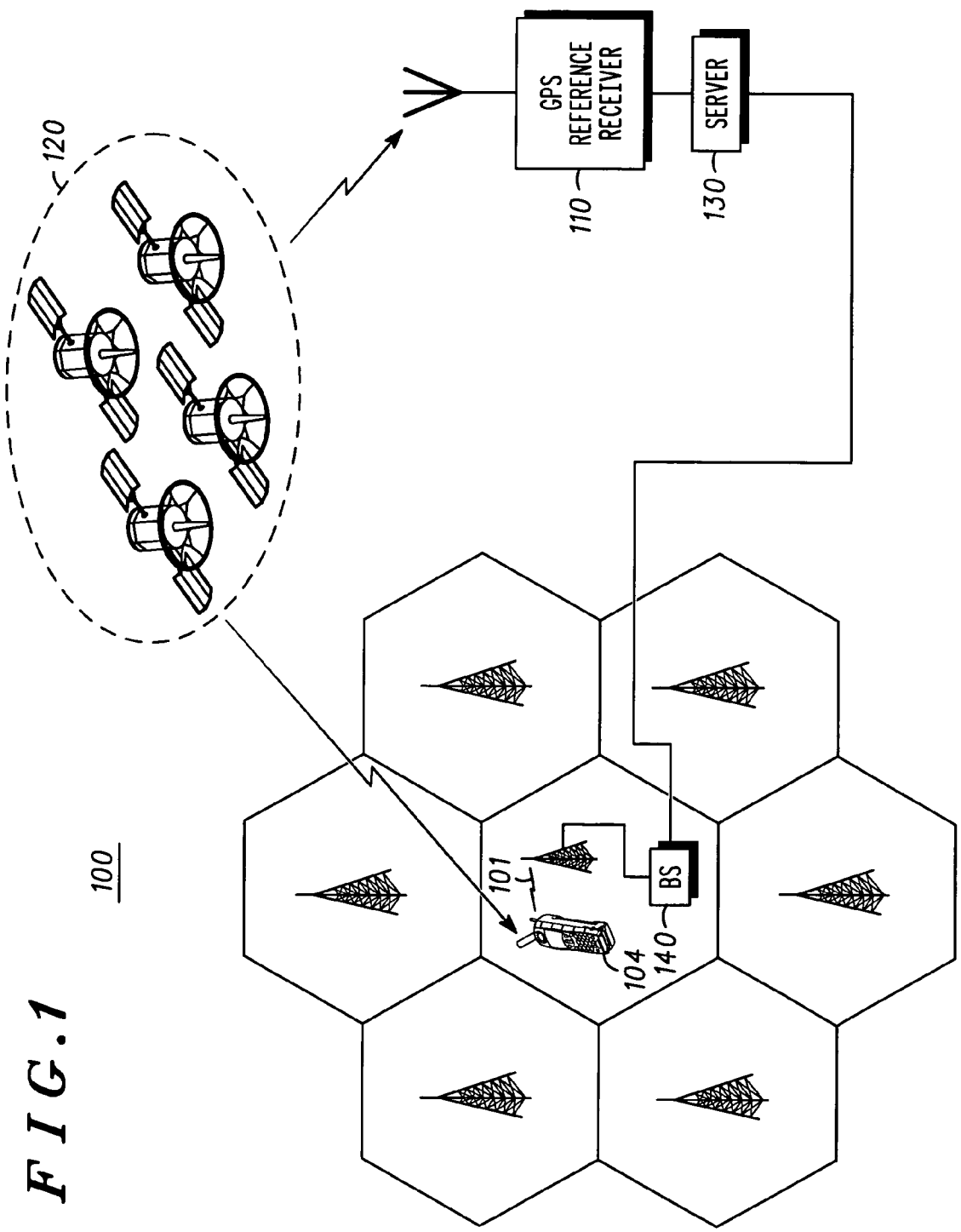
FIG. 1 illustrates a cellular communications network supporting assisted GPS location of a satellite positioning system enabled mobile receiver.

FIG. 1 is a network-assisted satellite positioning system 100 including generally a reference receiver 110 at a surveyed location having an unobstructed skyward view of satellites 120 in a constellation, and a server, or reference node, 130 coupled thereto. In some networks, the reference receiver is a part of the server or vice versa and the combination thereof constitutes the reference node. In other networks, the server is at another location. The reference node is generally coupled to several network base stations directly or indirectly via other network nodes, only one of which, base station 140, is identified.

The reference receiver receives satellite signals, and the reference node generates GPS assistance messages based on the received satellite signals in a format suitable for transmission over the network to one or more mobile receivers. The assistance messages are generally modulated on a cellular carrier signal 101, which is transmitted in a point-to-point mode to a particular cellular handset 104, or in a point-to-multipoint, or broadcast, mode to multiple mobile receivers.

The reference node also generates GPS data issue identifiers for transmission to GPS enabled mobile stations in cellular communications networks. The GPS data issue identifiers are used to indicate whether GPS data, for example corresponding ephemeris and almanac data stored at the mobile station requires updating.

Figure 2:
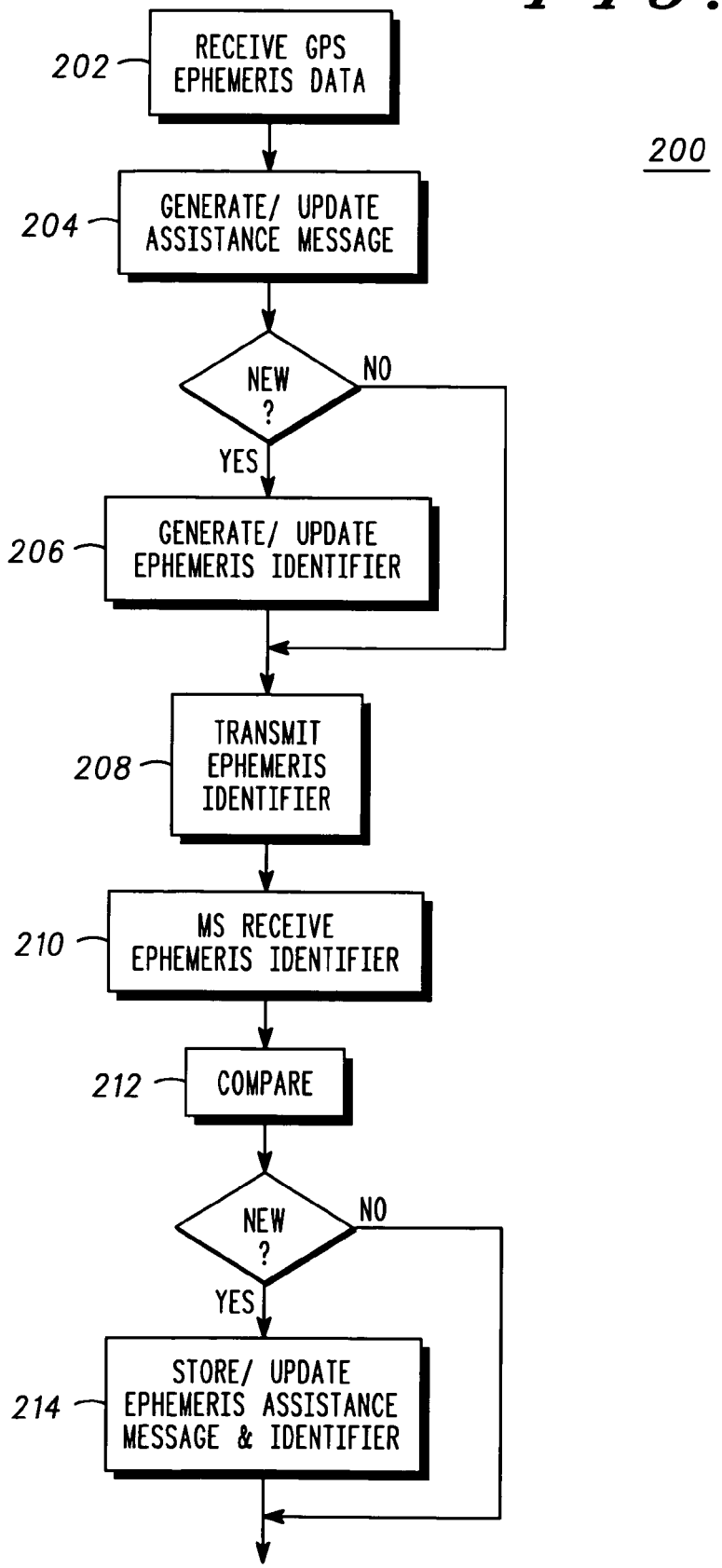
FIG. 2 illustrates an ephemeris data update process flow diagram.

FIG. 2 illustrates a process flow diagram 200 for updating a GPS ephemeris data issue identifier transmitted to a GPS enabled mobile station in a cellular communications network. Generally, a reference node, illustrated in FIG. 1, receives ephemeris data from each of a plurality of GPS satellites (usually 8-12 satellites) at block 202. Reference herein to "ephemeris data" includes generally ephemeris and correction clock data received at the reference node from a corresponding GPS satellite.

An ephemeris assistance message is generated including ephemeris data, correction clock data and other parameters, some of which may be provided by the network, for each satellite at block 204.

The ephemeris data including the correction clock data and the other parameters are updated at some known transmission interval, approximately 1 hours as discussed more fully below, also at block 202. Other data and parameters, for example transmission time as shown later as the first parameter of Tables 2 and 3, may be updated more frequently. The corresponding ephemeris assistance messages are also updated at block 204 based on the updated ephemeris data, correction clock data and other data and parameters communicated by the network in the assistance message.

A GPS ephemeris data issue identifier is generated at block 206 for each assistance message having new ephemeris data. The GPS ephemeris data issue identifier is only updated when the GPS ephemeris data updated. Particularly, the GPS ephemeris data issue identifier is not updated when parameters other than the GPS ephemeris data are updated or changed. In some embodiments, the ephemeris assistance message is updated only when the ephemeris data is updated.

In one embodiment, the GPS ephemeris data issue identifiers for each of the plurality ephemeris assistance messages are encoded in a corresponding sequence of binary digits. The sequence of binary digits also identifies the particular satellite from which the ephemeris data referenced by the ephemeris data identifier was obtained.

Figure 3:
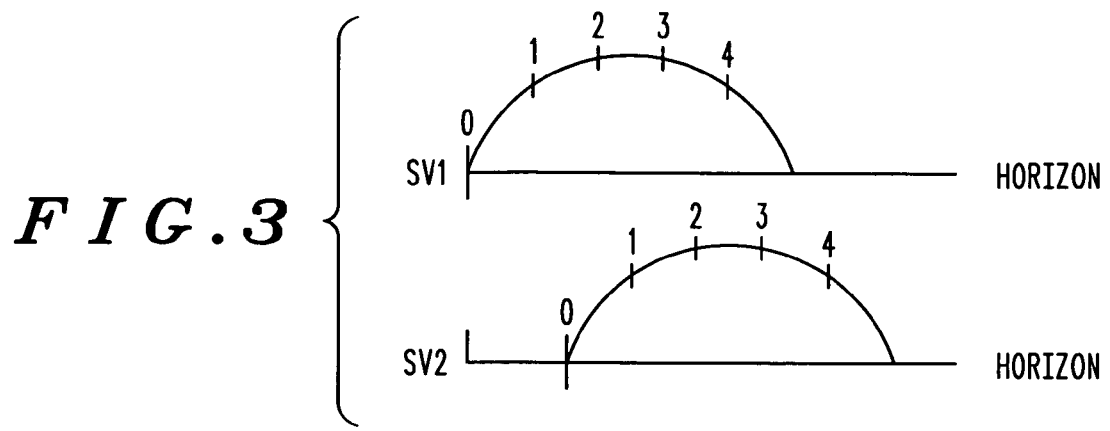
FIG. 3 illustrates periodic GPS ephemeris data transmission from GPS satellites.

FIG. 3 illustrates the trajectories of first and second satellites SV1 and SV2 rising above and setting below the horizon and the corresponding periodic ephemeris data transmissions, 0-4.

Figure 4:
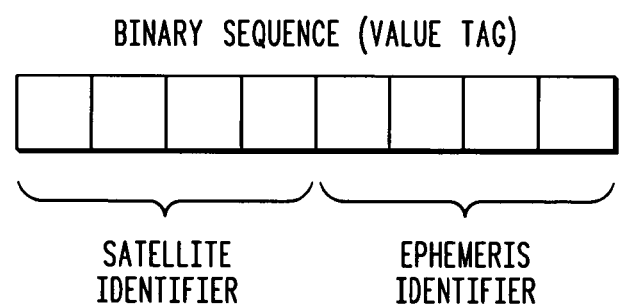
FIG. 4 illustrates a binary sequence having a satellite identifier and a corresponding ephemeris data identifier.

In FIG. 4, the ephemeris message has at least an 8 bit data field wherein 4 data bits are for a satellite identifier that identifies a particular GPS satellite and the other 4 data bits identify the GPS ephemeris data issue associated with the identified satellite. There are a sufficient number of unique binary satellite identifiers (16) to identify each of the 8-12 satellites of the GPS constellation observable at any given time.

Figure 5:
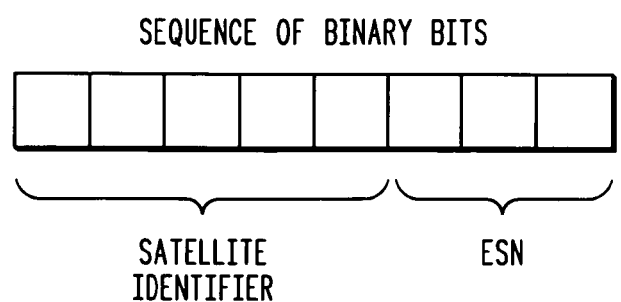
FIG. 5 is illustrates a sequence of binary bits.

In FIG. 5, an alternative GPS ephemeris data issue identifier for transmission to a GPS enabled mobile station in a cellular communications network comprises a first binary data field with at least 5 bits for satellite identifier data, and a second binary data field with at least 3 bits for an ephemeris sequence number (ESN). Preferably, the ESN is incremented only when the ephemeris data for the corresponding satellite is updated.

In the $3^{rd}$ generation (W-CDMA/UMTS) architecture, the GPS assistance message with the ephemeris and clock correction data and other parameters is the SIB, and the GPS ephemeris data identifier and corresponding satellite identifier is and encoded in a generalized value tag included in the Master Information Block (MIB).

In FIG. 2, the GPS ephemeris data issue identifier is transmitted over the cellular communications network at block 208, and received and read by a mobile station (MS) at block 210. The mobile station compares the GPS ephemeris data issue identifier with any GPS ephemeris data issue identifier stored previously at the mobile station for the corresponding ephemeris data at block 212. In one embodiment, the mobile station reads a new assistance message transmitted by the network only if the new GPS ephemeris data issue identifier is different than the stored GPS ephemeris data issue identifier at block 214 or there are no stored GPS ephemeris data issue identifier and ephemeris data.

Figure 6:
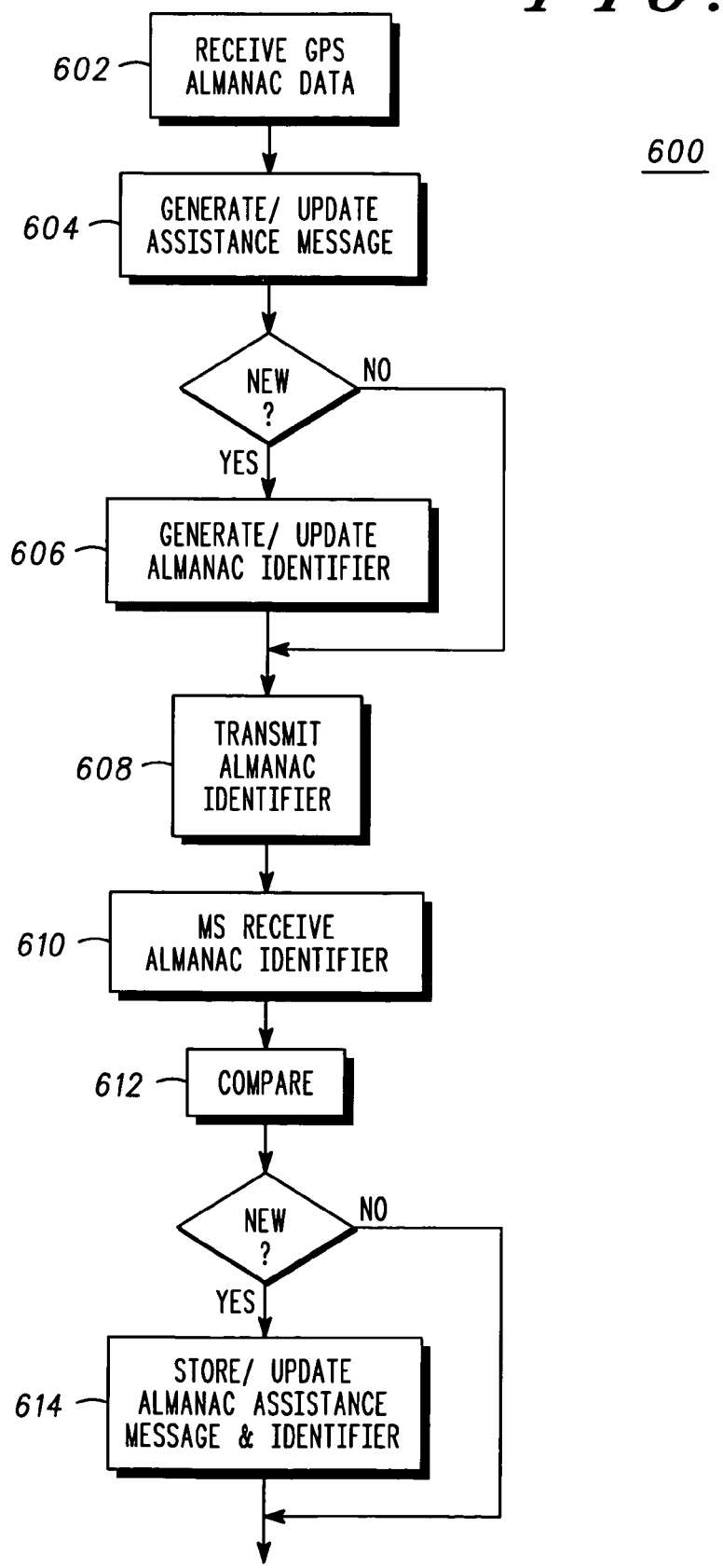
FIG. 6 illustrates an almanac data update process flow diagram.

FIG. 6 illustrates a process flow diagram 600 for updating a GPS almanac data issue identifier transmitted to a GPS enabled mobile station in a cellular communications network. Generally, a reference node, illustrated in FIG. 1, receives almanac and other data from GPS satellites at block 602.

An almanac assistance message is generated including almanac and other data and other parameters, some of which may be provided by the network, at block 604. The same almanac data is provided by all GPS satellites and therefore, unlike the case of ephemeris data, it is not necessary to generate a separate almanac assistance message for each satellite.

The almanac data are updated at some known transmission interval, approximately 18 hours, also at block 602. Other data and parameters, for example transmission time as shown later as the first parameter of Tables 2 and 3, may be updated more frequently. The almanac assistance message is updated based on the updated almanac and other data and parameters at block 604.

A GPS almanac data issue identifier is generated at block 606 for the almanac assistance message. In one embodiment of the invention, the GPS almanac data issue identifier is updated only when the GPS almanac data is updated. Particularly, the GPS ephemeris data issue identifier is not updated when parameters other than the GPS almanac data are updated or changed. In some embodiments, the almanac assistance message is updated only when the almanac data is updated.

The GPS almanac data issue identifier is transmitted over the cellular communications network at block 608, and received by a mobile station (MS) at block 610. The mobile station compares the GPS almanac data issue identifier with any GPS almanac data issue identifier stored previously at the mobile station for the almanac data at block 612. The mobile station reads a new almanac assistance message transmitted by the network if the GPS almanac data issue identifier is different than the stored GPS almanac data issue identifier at block 614 or there are no stored GPS almanac data issue identifier and almanac data.

In one embodiment, the GPS almanac data issue identifier is for a cell. The GPS almanac data identifier for the cell is encoded in at least a 2 bit binary data field, which may be updated by incrementing when the almanac data in the reference node is updated. In second embodiment, the GPS almanac data issue identifier is for a Public Mobile Land Network (PLMN). The GPS almanac data identifier for the PLMN is encoded in at least an 8 bit binary data field, which may also be updated by incrementing when the almanac data in the reference node is updated. In third embodiment, the GPS almanac data set occurrence identifier and the GPS almanac data identifier are used as a generalized identifier for the PLMN. The GPS almanac data set occurrence identifier is encoded in at least a 4 bit binary field and the GPS almanac data identifier is encoded in at least a 4 bit binary filed.

In the $3^{rd}$ generation (W-CDMA/UMTS) architecture, the GPS assistance message with the almanac and other data and parameters is an SIB, and the GPS almanac data identifier and corresponding GPS almanac data set occurrence identifier is encoded in a generalized value tag included in the Master Information Block (MIB).

In another embodiment of the invention, real-time GPS satellite integrity data is provided in a sequence of binary bits transmitted from the network to the mobile station, such as failed/failing satellite IDs. In one embodiment, the real-time integrity data is encoded in a value tag in a master information block (MIB).

Table 1 below illustrates parameters in an exemplary GPS ephemeris assistance message.

TABLE 1

Exemplary Content of the Ephemeris and Clock Correction Assistance Message

| Parameter | Description | Units |
|---|---|---|
| Transmission TOW | Approximate GPS time of week when this message is transmitted | secs |
| SVID | Satellite ID | |
| TLM Message | Telemetry Message | |
| TLM Reserved (C) | | |
| HOW | Handover Word | |
| WN | Week Number | weeks |
| C/A or P on L2 | Code(s) on L2 Channel | |
| URA Index | User Range Accuracy | |
| SV Health | Health Synopsis | |
| IODC | Issue of Data, Clock | |
| L2 P Data Flag | | |
| SF1 Revered | | |
| $T_{GD}$ | Correction for group delay | secs |

TABLE 1-continued

Exemplary Content of the Ephemeris and Clock Correction Assistance Message

| Parameter | Description | Units |
|---|---|---|
| $t_{oc}$ | Time of applicability of clock corrections | secs |
| $A_{f2}$ | Second order clock correction coefficient | secs/sec$^2$ |
| $A_{f1}$ | First order clock correction coefficient | secs/sec |
| $A_{f0}$ | Zero order clock correction | secs |
| $C_{rs}$ | Radial correction coefficient | meters |
| $\Delta n$ | Correction to mean motion | semi-circles/sec |
| $M_0$ | Mean anomaly | semi-circles |
| $C_{uc}$ | Argument of latitude correction coefficient | radians |
| E | Eccentricity | |
| $C_{us}$ | Argument of latitude correction coefficient | radians |
| $(A)^{1/2}$ | Square root of semi-major axis | meters$^{1/2}$ |
| $t_{oe}$ | Time of applicability of ephemeris | secs |
| Fit Interval Flag | | |
| AODO | | |
| $C_{ic}$ | Inclination correction coefficient | radians |
| $\Omega_0$ | Nominal longitude of ascending node | semi-circles |
| $C_{is}$ | Inclination correction coefficient | radians |
| $i_0$ | Nominal inclination | semi-circles |
| $C_{rc}$ | Radial correction coefficient | meters |
| $\omega$ | Argument of perigee | semi-circles |
| $\Omega$dot | Rate of change of right ascension | semi-circles/sec |
| Idot | Rate of change of inclination | semi-circles/sec |

Alternatively failed or failing satellites IDs detected by a real-time integrity monitor function at the network can be included in the end of the assistance message. Furthermore, they can be included in other assistance messages or be transmitted from the network to the handsets as an independent message.

There is one parameter in the ephemeris data that indicates the age of the current ephemeris data issue, i.e., time of ephemeris ($t_{oe}$) applicability. It should be noted that typically, a GPS satellite's time of ephemeris ($t_{oe}$) is two hours ahead of the current time "t" when it is initially made available by the satellite and can subsequently be made available to GPS enabled mobile stations. Consequently, a value of $t-t_{oe}$ of 2 hours corresponds to a possible four (4) hour period of use of the same ephemeris set ($-2$ hours $<=t-t_{oe}<=+2$ hours) indicating a four hour fit interval for each ephemeris set. Accordingly, one can push the period of applicability of any particular ephemeris set to 5 hours ($t-t_{oe}=+3$ hours) or more with very little affect on the satellite position and velocity error. In addition, this error is completely removed by tailored DGPS corrections for the entire satellite visibility pass. Table 4 below shows the content of the tailored DGPS corrections.

As a result discussed above, $t-t_{oe}$ age limit can be used by the handset to determine when it is necessary to read the cellular network transmitted ephemeris data again. The ephemeris assistance messages transmitted by the network may thus be ignored until the stored ephemeris set reaches its age limit, for example where the broadcast frequency of the ephemeris assistance messages are greater than the update frequency of the ephemeris data. The age of the ephemeris data may determined in the handset by calculating: $t-t_{oe}$, where "t" is the current time and "$t_{oe}$" is the Time of Ephemeris.

FIG. 3 illustrates an exemplary GPS almanac assistance message comprising the parameters shown in Table 2.

Table 2 illustrates an exemplary GPS almanac assistance message comprising the parameters shown in Table 2.

TABLE 2

Exemplary Content of the Almanac and Other Data Assistance Message

| Parameter | Description | Units |
|---|---|---|
| Transmission TOW | Approximate GPS time of week when this message is transmitted | Secs |
| SV Mask | Indicate the SVs that contain the pages being transmitted in this message | |
| LSB TOW | Least significant 8 bits of time of week | Secs |
| SFID 0 | Least significant bit of subframe (SF) ID | Repeat three times each corresponds to a different page no. as described in Table 3 |
| Data ID | Indicate the data ID field | |
| Page No. | Page No. of the SF for the following words | |
| Word 3 | | |
| Word 4 | | |
| Word 5 | | |
| Word 6 | | |
| Word 7 | | |
| Word 8 | | |
| Word 9 | | |
| Word 10 | | |

Similarly, there is one parameter in the almanac data that indicates age of the current almanac data issue, i.e., time of almanac ($t_{oa}$) applicability. As a result, $t-t_{oa}$ age limit can be used by the handset to determine when it is necessary to read the cellular network transmitted almanac data again. The almanac assistance messages transmitted by the network may thus be ignored until the stored almanac set reaches its age limit, for example where the broadcast frequency of the almanac assistance message is greater than the update frequency of the almanac data. The age of the almanac data may be determined in the handset by calculating: $t-t_{oa}$, where "t" is the current time and "$t_{oa}$" is the Time of Almanac.

TABLE 3

Mapping of Almanac and Other Data to Subframe ID and Page Numbers

| Data Type | Subframe | Page(s) |
|---|---|---|
| Almanac Data (SV1-24) | 5 | 1-24 |
| Almanac Data (SV25-32) | 4 | 2-5,7,8 |
| SV Health (SV1-24) | 5 | 25 |
| SV Health (SV25-32) | 4 | 25 |
| Ionospheric/UTC | 4 | 18 |

Listed below is an exemplary DGPS correction assistance message comprising the parameters shown in Table 4.

TABLE 4

Exemplary Content of the DGPS Assistance Message

| Parameter | Description | Parameters Sent |
|---|---|---|
| GPS TOW | GPS time of week at which the correction data is valid, secs | Once per message |
| Status/Health | Health and Status, including UDRE SF | Once per message |
| N_SV | Number of satellites for which corrections appear | Once per message |
| SVID | GPS satellite for which corrections apply | N_SV times |
| IODE | Current ephemeris issue for which the corrections apply | N_SV times |

TABLE 4-continued

Exemplary Content of the DGPS Assistance Message

| Parameter | Description | Parameters Sent |
|---|---|---|
| UDRE | User Differential Range Error (accuracy predictor, meters) | N_SV times |
| PRC (or PRC - $PRC_{avg}$) | Compressed pseudo range correction, meters | N_SV times |
| RRC (or RRC - $RRC_{avg}$) | Compressed range rate correction, meters/sec | N_SV times |
| $\Delta PRC_i$ | Difference in PRC values, meters | i times |
| $\Delta RRCi$ | Difference in RRC values, meters/sec | i times |

This message contains several aspects of the intelligent compression. They are evident from Table 4, while others are more subtle. The DGPS time tag (GPS TOW) is compressed relative to the full twenty bits of the RTCM standard for DGPS correction data due to each mobile having reasonably reliable timing information. The differential correction data itself is compressed either by simply reducing the bits defined in RTCM while maintaining the required location accuracy or by subtracting the average value of the corrections across all satellites from each PRC and RRC value. This average value reflects the common time and frequency biases in the correction data which are induced by the oscillator offset and drift. These biases have no effect on the navigation solution of the differentially corrected mobile stations and so can be removed. Alternatively, if the DGPS reference receiver has already removed the average of the correction values, or the drift of the DGPS reference receiver's clock is known to be insignificant relative to the correction values, then this operation is not required. In addition, it is usually not necessary to include $\Delta RRC$ values for the previous IODE's, since the velocity errors induced by ephemeris age are small relative to the nominal latency errors. However, in certain applications, where velocity accuracy is important, it can be advantageous to include them. In addition, when SA is de-activated by the Department of Defense, the errors induced by neglect of the $\Delta RRC$ values will become more significant, relatively speaking. Therefore, $\Delta RRC$ could be optional. Depending on the particular application, certain parameters can be optional too or additional parameters can be included. The parameter i in Table 4 indicates the number of previous IODE values which are included: this number will range from 1-4, depending upon the bandwidth reduction required (a value of 4 corresponds to the maximum infrastructure bandwidth reduction). Additionally, if fewer than 4 is utilized for this parameter, the $\Delta PRC$ (and perhaps $\Delta RRC$) values need not be continuous: i.e., it may be advantageous to skip the $\Delta PRC$ (and perhaps $\Delta RRC$) values for the ephemeris copy closest to the current ephemeris, since it produces the smallest differences. For example, one can transmit the corrections of the current IODE with the one prior to the one older than the current IODE. Finally, because the $\Delta PRC$ difference values are driven by ephemeris age error and not by normal DGPS latency effects (e.g., SA acceleration), they do not have to be sent as frequently as every short period, such as thirty seconds. A longer broadcast period will aid in data compression. In the worst case, sending the $\Delta PRC$ difference values once a longer period, such as per minute, or even longer when SA is off, will suffice. One option is to use a $\Delta\_Count$ parameter to indicate this alternating scheme. The worst case occurs when the ephemeris is oldest, which suggests an additional compression of the data based inversely on age: i.e., the more recent PRC difference values will be sent less frequently. Using these two compression techniques, the number of bytes needed to transport the DGPS message to all visible satellites is less than eighty-two bytes. Of course, if the message length is less a concern, the compression techniques described above become optional. Despite this obvious fact, the principle of applying DGPS corrections based on the current and previous IODEs is still valid for transmission bandwidth savings, i.e., by reducing or eliminating the frequent update of the ephemeris and clock correction data.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for updating a satellite positioning system ephemeris data issue identifier transmitted to a satellite positioning system enabled mobile station in a cellular communications network, comprising:

receiving satellite positioning system ephemeris data at a reference node in communication with a cellular communications network;

generating an assistance message including satellite positioning system ephemeris data and other parameters;

generating a satellite positioning system ephemeris data issue identifier;

receiving updated satellite positioning system ephemeris data and other updated parameters;

updating the satellite positioning system ephemeris data issue identifier only when the satellite positioning system ephemeris data has been updated.

2. The method of claim 1, not updating the satellite positioning system ephemeris data issue identifier when parameters other than the satellite positioning system ephemeris data change.

3. The method of claim 1, transmitting a satellite positioning system ephemeris data issue identifier over the cellular communications network, receiving the satellite positioning system ephemeris data issue identifier at a mobile station, comparing the received satellite positioning system ephemeris data issue identifier with a corresponding satellite positioning system ephemeris data issue identifier stored at the mobile station, reading a corresponding ephemeris assistance message at the mobile station only if the received satellite positioning system ephemeris data issue identifier is different than the stored satellite positioning system ephemeris data issue identifier.

4. The method of claim 1, receiving satellite positioning system ephemeris data from a plurality of satellites at a reference node in communication with a cellular communications network;

generating a plurality of assistance messages including satellite positioning system ephemeris data from the plurality of satellites and other parameters;

generating a satellite positioning system ephemeris data issue identifier for each of the plurality of assistance messages;

updating the plurality of satellite positioning system ephemeris data issue identifiers only when the satellite positioning system ephemeris data of the corresponding assistance message has been updated.

5. The method of claim 4, encoding each of the satellite positioning system ephemeris data issue identifiers and a corresponding satellite identifier in a corresponding sequence of binary digits, transmitting the sequence of binary digits over the network.

6. A method for updating a satellite positioning system almanac data issue identifier transmitted to a satellite positioning system enabled mobile station in a cellular communications network, comprising:
receiving satellite positioning system almanac data at a reference node in communication with a cellular communications network;
generating an assistance message including satellite positioning system almanac data and other parameters;
generating a satellite positioning system almanac data issue identifier;
receiving updated satellite positioning system almanac data and other updated parameters;
updating the satellite positioning system almanac data issue identifier only when the satellite positioning system almanac data has been updated.

7. The method of claim 6, not updating the satellite positioning system almanac data issue identifier when parameters other than the satellite positioning system almanac data change.

8. The method of claim 6,
transmitting a satellite positioning system almanac data issue identifier over the cellular communications network,
receiving the satellite positioning system almanac data issue identifier at a mobile station,
comparing the received satellite positioning system almanac data issue identifier with a satellite positioning system almanac data issue identifier stored at the mobile station,
reading an almanac assistance message at the mobile station only if the received satellite positioning system almanac data issue identifier is different than the stored satellite positioning system almanac data issue identifier.

9. The method of claim 6, the satellite positioning system almanac data issue identifier is for a cell, updating the satellite positioning system almanac data issue identifier by incrementing a 2-bit data field when the almanac data in the reference node is updated.

10. The method of claim 6, the satellite positioning system almanac data issue identifier for a Public Mobile Land Network (PLMN) value tag, updating the value tag by incrementing an 8-bit data field when the almanac data is in the reference node is updated.

11. A method for updating a satellite positioning system navigation data value tag transmitted to a satellite positioning system enabled mobile station in a communications network, comprising:
receiving satellite positioning system navigation data at a reference node in communication with the communications network;
generating an assistance message including satellite positioning system navigation data;
generating a satellite positioning system navigation data value tag;
receiving updated satellite positioning system navigation data;
updating the satellite positioning system navigation data value tag only when the satellite positioning system navigation data has been updated,
the satellite positioning system navigation data including at least one of ephemeris and almanac data.

12. The method of claim 11, encoding each of the satellite positioning system navigation data value tags in a corresponding sequence of binary digits as a 4-bit +4-bit value tag, transmitting the sequence of binary digits over the network.

13. A method in a satellite positioning system enabled wireless communication station, the method comprising:
receiving a satellite positioning system navigation data issue identifier in a master information block at the satellite positioning system enabled wireless communication station,
the satellite positioning system navigation data issue identifier comprising a data field;
identifying a data issue associated with a particular satellite using the satellite positioning system navigation data issue identifier.

14. The method of claim 13,
identifying the data issue associated with the particular satellite using the data field of the satellite positioning system navigation data issue identifier,
determining whether to update a navigation assistance message based on the data issue identifier.

15. A satellite positioning system enabled wireless communication station comprising:
a receiver of the satellite positioning system enabled wireless communication station configured to receive a satellite positioning system navigation data issue identifier in a master information block,
the satellite positioning system navigation data issue identifier comprising a data field;
the satellite positioning system enabled wireless communication station configured to identify a data issue associated with a particular satellite using the satellite positioning system navigation data issue identifier.

16. The station of claim 15,
the satellite positioning system enabled wireless communication station configured to identify the data issue associated with the particular satellite using the data field of the satellite positioning system navigation data issue identifier
the satellite positioning system enabled wireless communication station configured to determine whether to update a navigation assistance message based on the data issue identifier.

* * * * *